United States Patent [19]

Ido et al.

[11] 4,086,654
[45] Apr. 25, 1978

[54] ELECTRONIC TIMEPIECE CALCULATOR

[75] Inventors: Kazuo Ido; Mitsuaki Maruyama, both of Suwa, Japan

[73] Assignee: Kabushiki Kaisha Suwa Seikosha, Tokyo, Japan

[21] Appl. No.: 767,272

[22] Filed: Feb. 10, 1977

Related U.S. Application Data

[63] Continuation of Ser. No. 522,085, Nov. 7, 1974, Pat. No. 4,041,295.

[51] Int. Cl.² .................. G06F 7/48; G06F 15/02; G04B 19/30
[52] U.S. Cl. ............................. 364/705; 58/50 R; 58/152 R; 340/365 R; 364/709
[58] Field of Search .................. 235/152, 156, 160; 58/50 R, 152 R; 340/365 R, 365 S

[56] References Cited

U.S. PATENT DOCUMENTS

| | | | |
|---|---|---|---|
| 3,526,892 | 9/1970 | Bartlett et al. | 340/365 S |
| 3,715,746 | 2/1973 | Hatano | 340/365 S |
| 3,803,834 | 4/1974 | Reese | 58/152 R |
| 3,813,533 | 5/1974 | Cone et al. | 235/156 |
| 3,816,730 | 6/1974 | Yamamoto et al. | 235/156 |
| 3,852,952 | 12/1974 | Vittoz et al. | 235/156 X |
| 3,855,461 | 12/1974 | Stockwell | 235/156 |

*Primary Examiner*—Jerry Smith
*Attorney, Agent, or Firm*—Blum, Moscovitz, Friedman & Kaplan

[57] ABSTRACT

A calculator particularly suited for use in a small-sized electronic timepiece due to the reduction in size of the keyboard is provided. A small-sized electronic wristwatch having time-keeping circuitry and calculator circuitry includes an input circuit for supplying both data signals representative of numerical information and functional signals representative of operations, decimal-point, clearing and the like to effect processing of the numerical information supplied by the data signals. The numerical input circuit may include one switch the selective actuation of the switch supplying data signals representative of a particular number from the numerical input circuit to the calculator circuitry. Rotary switches and dual purpose switches may be incorporated in the input circuit.

4 Claims, 12 Drawing Figures

FIG. I
PRIOR ART

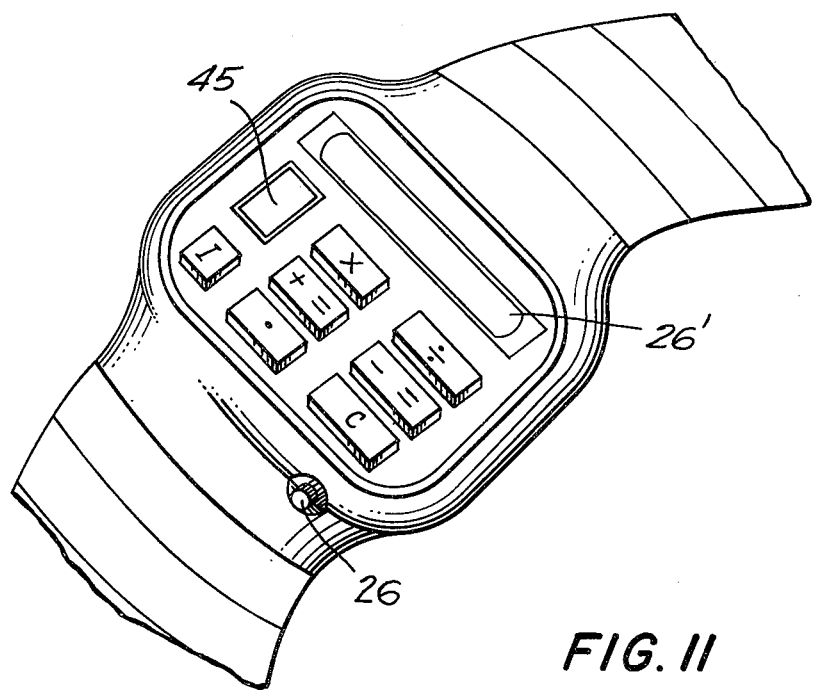
FIG. II

ELECTRONIC TIMEPIECE CALCULATOR

This is a continuation of application Ser. No. 522,085, filed Nov. 7, 1974 and now U.S. Pat. No. 4,041,295.

BACKGROUND OF THE INVENTION

This invention is directed to a small-sized electronic digital display timepiece including a calculator, and in particular to improved circuitry for simplifying and reducing the size of a keyboard for a calculator to render same more particularly suited for use in a small-sized electronic timepiece.

The development of small-sized integrated circuitry has resulted in the production of small-sized desk-top and hand carried calculators at sharply reduced prices. The portability and reduced cost of such small-sized calculators have contributed to their immense popularity. In furtherance of this trend toward reduced size and portability, calculator circuits of a size small enough for incorporation into electronic digital display wristwatches are readily available through application of large scale integration techniques. However, the reduction in the size of the claculator in order to enable same to be utilized in an electronic wristwatch has presented certain problems not heretofore experienced in desk-top calculators.

The development of said integrated circuit techniques have enabled the calculator circuitry to be easily incorporated into the small-sized watch cases. However, because the input circuitry of conventional calculators require a keyboard having at least sixteen keys, each key being of sufficient size to allow the keys to be displaced by the fingers of the operator, the size of the keyboard has rendered the use of such calculator circuitry in an electronic timepiece less than completely satisfactory. Accordingly, a keyboard which is particularly suitable for use in a desk-top or hand carried calculator is not practical when utilized with a calculator circuit incorporated in an electronic timepiece. Accordingly, a calculator including improved input circuitry to effect a reduction in the number of keys and hence the size of the keyboard is required in order to effect an improved calculator and render same practical for use in an electronic wristwatch.

SUMMARY OF THE INVENTION

Generally speaking, in accordance with the invention, a calculator input circuit particularly suited for use in an electronic timepiece having timekeeping circuitry and calculating circuitry is provided. The input circuit is adapted to supply data signals representative of numerical information to the calculator circuit and is further adapted to supply functional signals representative of operations, decimal-point, clearing and the like to said calculator circuitry to effect processing of said numerical information supplied by said data signal. The improved input circuitry includes a function switching circuit coupled to the calculator circuit, the function switching circuit including function switches coupled thereto, the function switching circuit supplying function signals representative of a plurality of functions to the calculator circuit in response to the selective actuation of one of said function switches. A numerical input circuit is coupled to said calculator circuitry to produce said data signals, said numerical input circuit including one switch, selective actuations of said switch supplying data signals representative of a number to said calculator circuit. Rotary switch means and dual purpose switch means, the selection of the effect of actuation of the latter depending on a control switch, may also be used.

Accordingly, it is an object of this invention to provide an improved calculator input circuit for use in an electronic digital display wristwatch and calculator.

Another object of this invention is to provide improved input circuit for a calculator wherein the number of keys comprising the keyboard is substantially reduced.

Still another object of this invention is to provide an electronic timepiece including a calculator, wherein the input circuit of the calculator is additionally utilized as control circuitry for the electronic timepiece circuitry.

Still other objects and advantages of the invention will in part be obvious and will in part be apparent from the specification.

The invention accordingly comprises the features of construction, combination of elements and arrangement of parts which will be exemplified in the construction hereinafter set forth and the scope of the invention will be indicated in the claims.

BRIEF DESCRIPTION OF THE DRAWINGS

For a fuller understanding of the invention, reference is had to the following description taken in connection with the accompanying drawings, in which:

FIG. 11 is a perspective view of an electronic digital display wristwatch including a calculator having the input circuit depicted in FIG. 11.

DETAILED DESCRIPTION OF THE PREFERRED EMBODIMENTS

Figure 1:
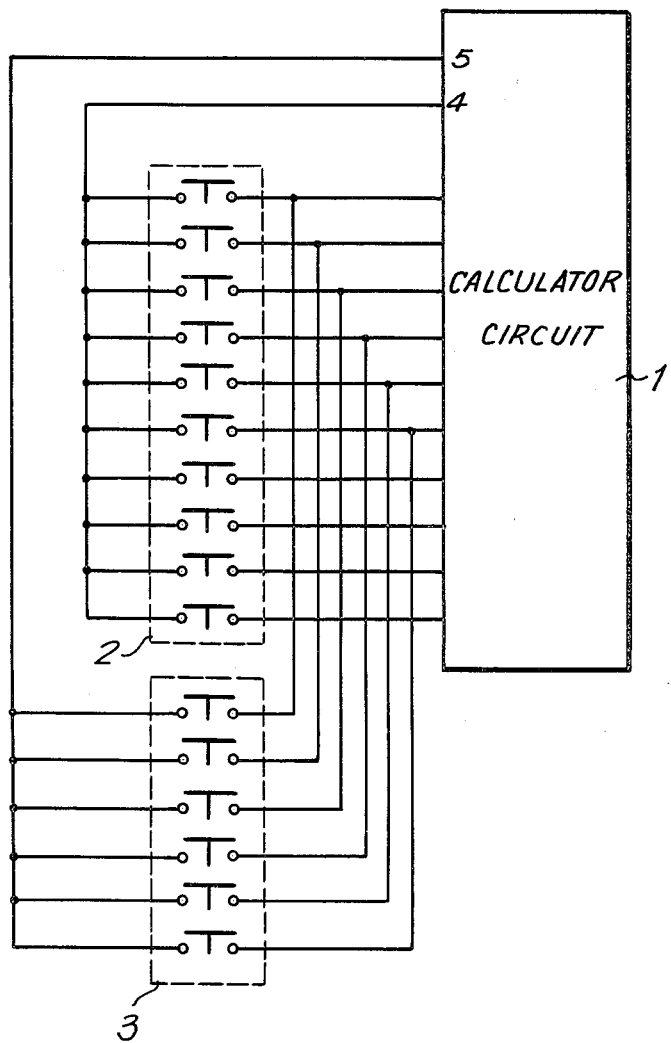
FIG. 1 is a block circuit diagram of a calculator circuit and input circuitry therefor constructed in accordance with the prior art.

Reference is now made to FIG. 1 wherein an input circuit for a desk-top electronic calculator constructed in accordance with the prior art is depicted. A calculator circuit 1 comprises the entire processing unit of the electronic calculator including a common input electrode terminal 4 for the input of numerical information and a common input electrode terminal 5 for the input of functional information such as operation, decimal-point, clear and the like to be performed by the calculator circuit on the numerical information supplied thereto. In view of the conventional nature of calculator circuit 1, it is understood that circuit 1 represents all of the circuitry of a calculator with the exception of the input circuit and does not constitute any part of the instant invention. Numerical switches 2 are provided for enabling data signals representative of numerical information to be selectively applied to the calculator circuit. Accordingly, 10 numerical switches produce the numbers 0, 1, . . . 9, in response to the selective pressing of the push button switches to thereby effect the application of data signals to the calculator circuit representative of the number selected. Push-button function input switches 3 are also provided, the selective closing of the push-button switches producing function signals representative of a particular function to be applied to the calculator circuit in order to process the numerical information supplied by the numerical switches 2. Among the functions selected are certain operations such as multiplication, division, plus-equal and minus-equal, decimal point and clear. Accordingly, in conventional desk-top calculators, the function switches 3 and the numerical input switches 2 are incorporated into a keyboard having 16 keys representing the operative push-button elements. By such an arrangement, a desk-top calculator is easily operated and effects quick and simple calculations.

Figure 2:
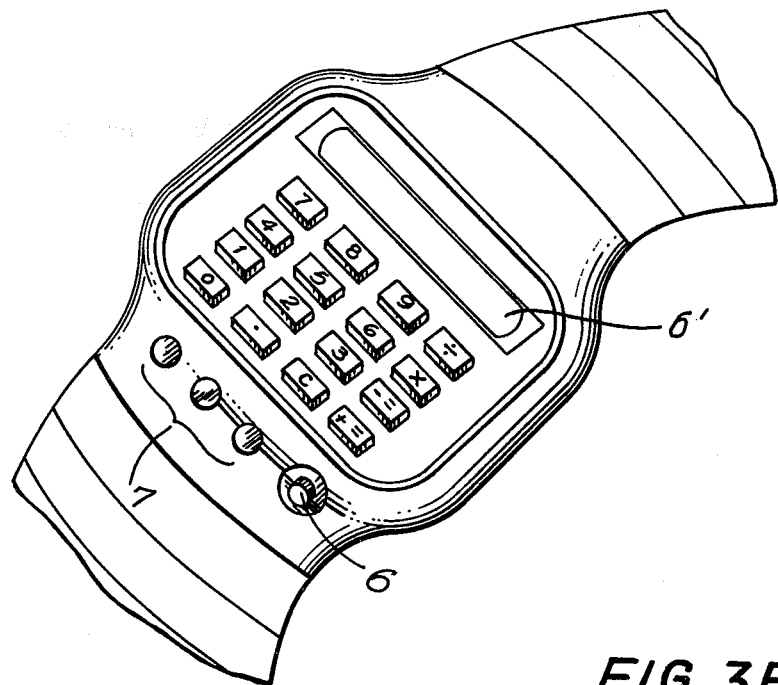
FIG. 2 is a perspective view of an electronic digital display timepiece including a calculator having an input circuit constructed in accordance with the calculator circuit illustrated in FIG. 1.

However, when such a keyboard is incorporated into an electronic digital display wristwatch, as is illustrated in FIG. 2, the lack of space on the front of the wristwatch causes a keyboard having 16 tiny keys to be both cumbersome, and difficult to operate without error. As depicted in FIG. 2, the electronic digital display timepiece includes time correction switches 7 coupled to the timekeeping circuitry of the watch in a well known manner and a display changing switch 6 which selects for display by display 6' either the output of the calculator circuitry or the output of the timekeeping circuitry. The timekeeping circuitry would preferably run continuously so that current time would always be available for display. Accordingly, an electronic digital display wristwatch having a calculator with a keyboard utilizing 16 keys or buttons disposed within the space on the front of the watch causes the calculator to be cumbersome to operate and yields inaccurate results due to the inability to press certain keys without also pressing other keys.

Figure 3B:
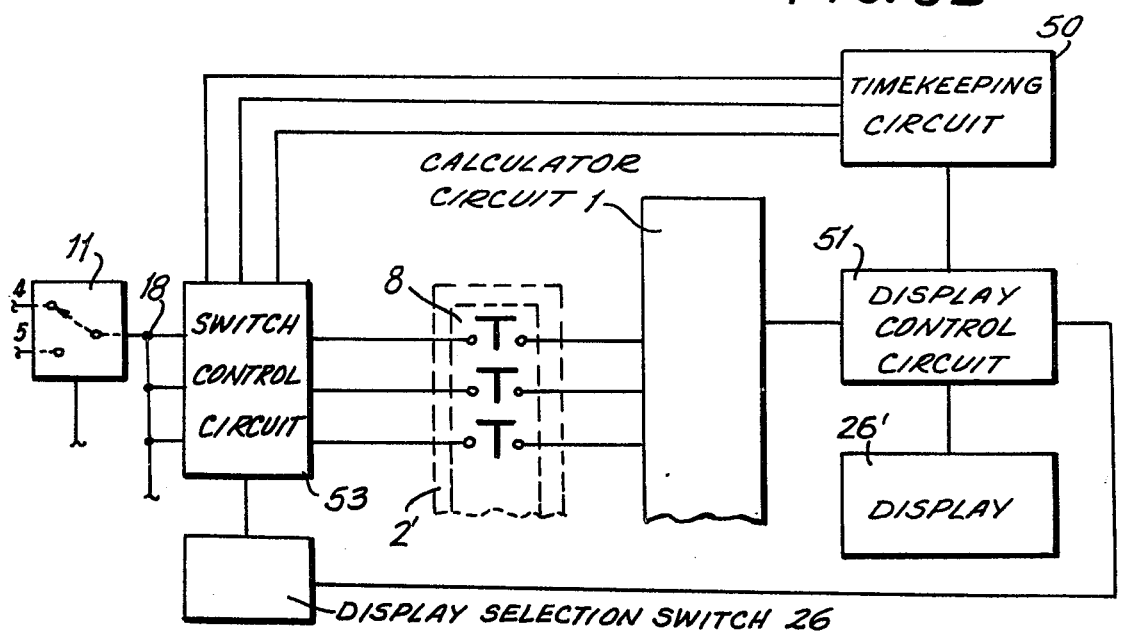
FIG. 3B is a block circuit diagram showing further features of a timepiece including the circuit of FIG. 3A.
Figure 3A:
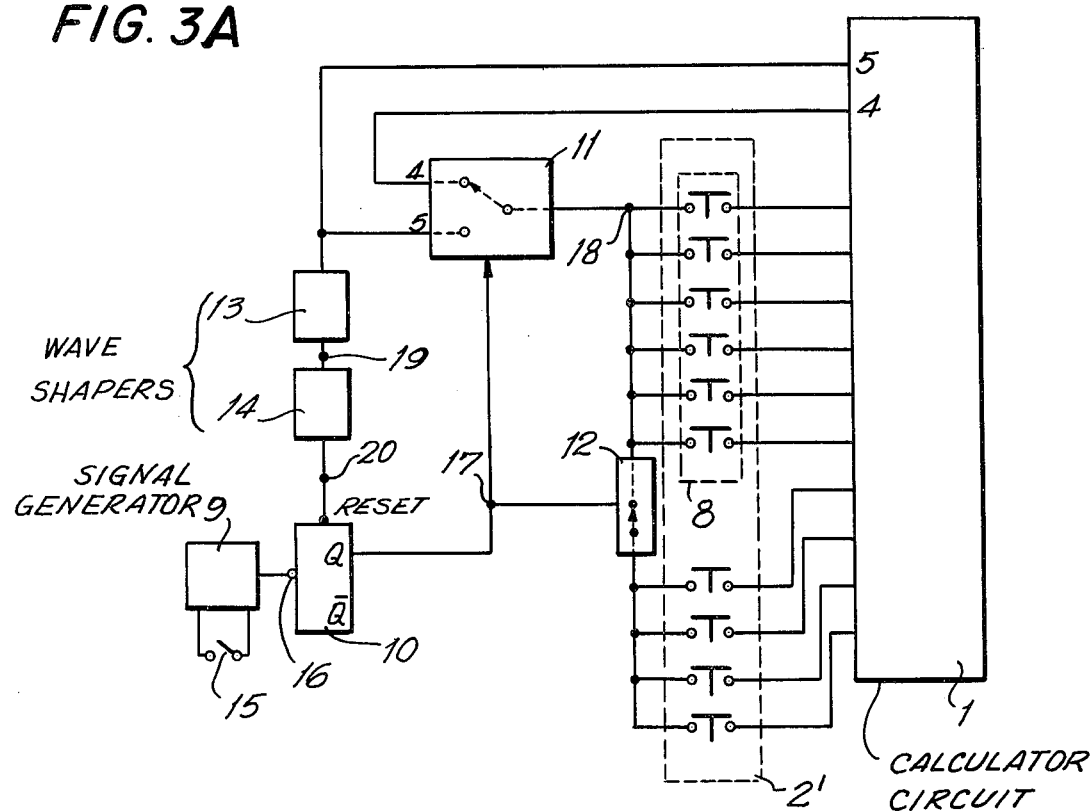
FIG. 3A is a block circuit diagram of an input circuit for a calculator constructed in accordance with the instant invention.

Reference is now made to FIG. 3A, wherein a desk-top calculator including an improved input circuit constructed in accordance with the instant invention is depicted, like reference numerals being utilized to denote like elements depicted in FIG. 1. All of the push-button switches in the block 2' represent numerical input switches for supplying data signals representative of numerical information to the calculating circuit, whereas the push-button switches in block 8, are also utilized in a second mode as function switches for producing function signals representative of the operations, a decimal-point and clear functions discussed above.

When the calculator input circuitry is in a first mode, each of the switches in block 2' are adapted to produce data signals representative of numerical information, and in a second mode switches in block 8 produce functional signals, the mode being selected by the actuation of switch 15. Switch 15 is coupled through a circuit generator 9, to flip-flop 10 and in response to an actuation of switch 15, signal generator 9 produces a trigger pulse. The trigger pulse produced is particularly illustrated as wave 21 in FIG. 4, and is produced at terminal 16 of flip-flop 10. Prior to the application of the trigger pulse at the input 16 of flip-flop 10, the flip-flop is at rest and the output at terminal Q is zero. Accordingly, node 17 is maintained at zero potential. The potential at node 17 controls the state of electronic switching circuits 11 and 12. When the output Q of the flip-flop is zero, electronic switch 11 remains closed to terminal 4 and open to terminal 5 while electronic switch 12 remains closed, and each of the switches in block 2' are coupled to the numerical information common electrode terminal 4. Accordingly, 10 numerical switches are provided, and actuation of the switches supplies data signals representative of numerical information from 0 to 9 to the calculating circuit.

Figure 4:
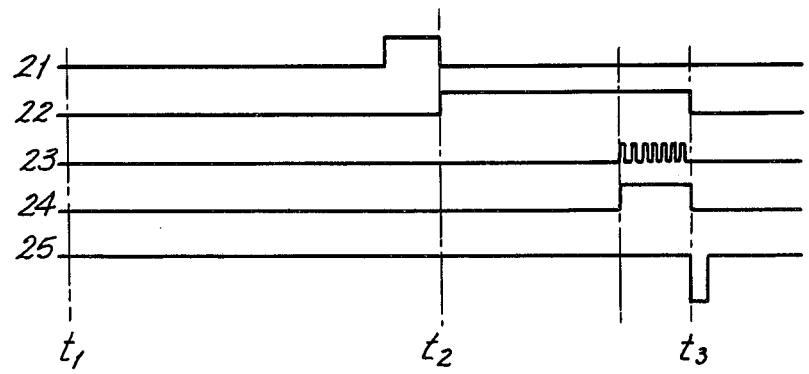
FIG. 4 is a wave diagram representative of the operation of the input circuit illustrated in FIG. 3A.

In response to the closing of switch 15, the pulse generator 9 supplies a trigger pulse, indicated as 21 in FIG. 4, to input terminal 16 of flip-flop 10. In response to the falling edge of input pulse 21, the flip-flop 10 is set to a positive or "1" state, and supplies a pulse 22 at node 17. The "1" pulse at node 17 effects an opening of electronic switch 12, and a switching of electronic switch 11 to close terminal 5 and open terminal 4. The switching of electronic switch 11 couples the switches in block 8 to the function input electrode terminal 5 of the calculator circuit and the opening of switch 11 disables the remaining switches in block 2'. Since only the switches in block 8 are coupled to the calculator circuit the switches in block 8 function to produce functional signals representative of the operation, decimal-point and clear to the calculating circuit.

Also coupled to terminal 5 of the electronic switch 11 are wave shaping circuits 13 and 14 which, in response to each function signal produced at node 18 by the actuation of one of the switches in block 8, produce pulses 24 and 25 indicated in FIG. 4 at nodes 19 and 20 respectively, to thereby reset the output Q of flip-flop to "0" to close electronic switch 12, and return electronic switch 11 to a state at which terminal 4 is closed and terminal 5 is open. Thus, after numerical data is fed to calculator circuit 1 through terminal 4 by selective operation of all ten switches, switch 15 is actuated and the input circuitry is reset to effect an input of a function by selective actuation of one switch in block 8. This, in turn, automatically resets flip-flop 10 to permit further insertion of numerical data.

In operation, the circuit depicted in FIG. 3A operates as illustrated in the waveforms of FIG. 4. At a time $t_1$ to $t_2$ actuation of the switches in block 2' produce data signals representative of numerical information. Between $t_2$ and $t_3$, the switches in block 8, supply functional signals representative of operations, decimal-point and clear to the calculator circuit 1, the period $t_2$ being started by the closing of switch 15 and being terminated at $t_3$ by the operation of one of the switches in block 8. Finally, after the time $t_3$, the flip-flop is automatically reset and the calculator is reset to remain at the $t_1$ condition.

Accordingly, the number of externally exposed manually operated switches required by such a calculator is reduced from 16 utilized in conventional desk-top calculators to 11 by the input circuit arrangement depicted in FIG. 3A. Such an arrangement particularly lends itself to an electronic wristwatch.

Referring now to FIG. 3B, the circuit of FIG. 3A is depicted as it would be coupled to the timekeeping and display circuitry of an electronic timepiece. Timekeeping circuit 50 and calculator circuit 1 would be provided as inputs to display control circuit 51 which would consist of logic circuits to selectively connect either the output of the calculator circuit or the timekeeping circuit to display 26'. The logic circuit of display circuit 51 is controlled by a display selection switch 26 which would be provided on the exterior of the timepiece. In order to reduce the total number of switches provided, three of the switches in block 8 can, if desired, serve still another function in addition to the function input and data input functions of the timekeeping circuitry. These switches can be connected to the calculator input circuitry, namely node 18 which is coupled to electronic switch 11, or to timekeeping circuit 50, depending on the state of switch control circuit 53, said state being governed by display selection switch 26. When the three selected switches of block 8 are coupled to timekeeping circuit 50, they perform the time correction function in a well known manner. Any of the switches of block 2' could be selected for this purpose. Thus, when display selection switch 26 is in one state, the selected switches of block 8, when actuated, correct the timekeeping circuit to effect the correction of displayed time on display 26'.

Figure 5:
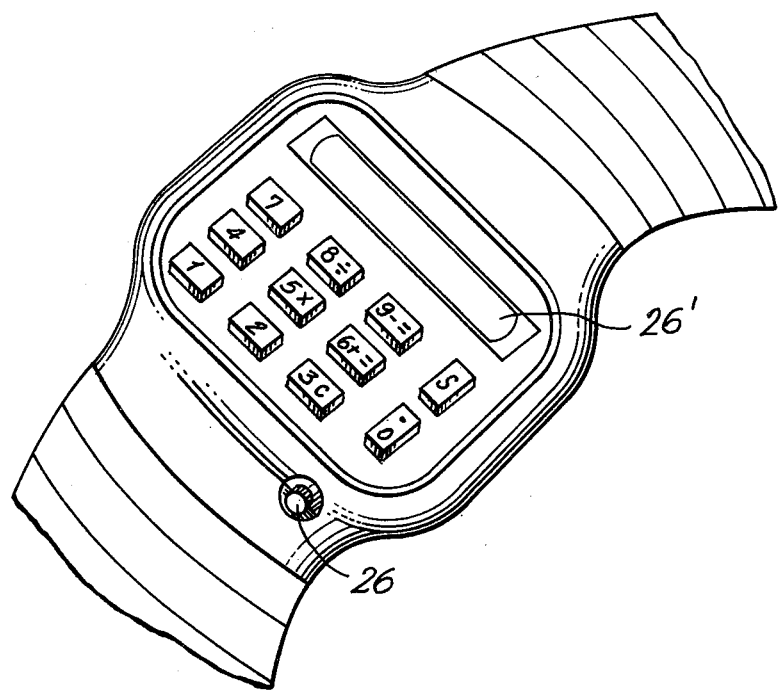
FIG. 5 is a perspective view of an electronic digital display wristwatch constructed in accordance with the instant invention and utilizing the input circuit depicted in FIG. 3A.

An electronic wristwatch including a calculator wherein the input circuit depicted in FIGS. 3A and B is utilized is depicted in FIG. 5. It is noted that 11 keys are provided in accordance with the input circuit illustrated in FIG. 3A. By way of example, the 1, 4 and 7 keys could also be utilized as hours, minutes and seconds correction switches and could be labelled 1H, 4M and 7S. It is further noted, that various combinations are contemplated by the invention and the functions illustrated by the display panel, or the arrangement of the display panel or manner in which the keyboard is organized is not limited to that depicted herein.

Figure 6:
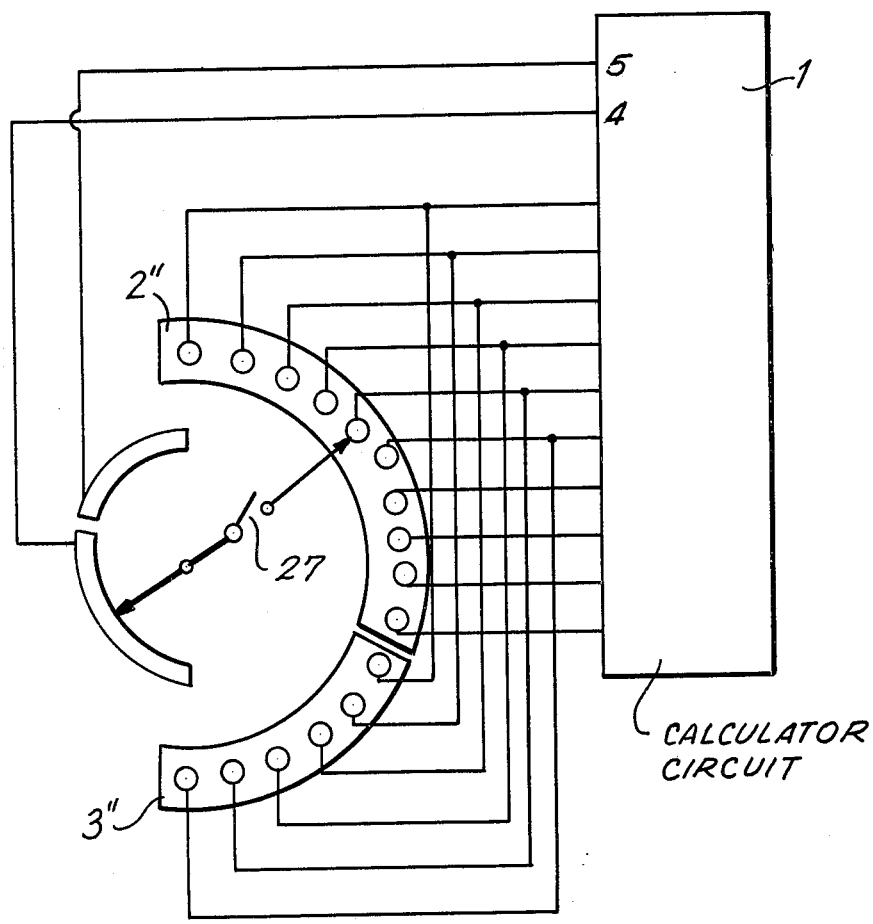
FIG. 6 is a block circuit diagram of an input circuit for a calculator constructed in accordance with an alternate embodiment of the instant invention.

Reference is now made to FIG. 6, wherein input circuitry for a desk-top calculator constructed in accordance with an alternate embodiment of the instant invention is depicted, like reference numerals being utilized to denote like elements illustrated in FIG. 1. Accordingly, the switches in block 2 and switches in block 3 of the conventional calculator input circuitry illustrated in FIG. 1 are replaced by a rotary switch having 16 terminals grouped into the terminals 2" and 3". Terminals 2" and 3" have common electrodes 4 and 5 and a single rotary blade including a two-position switch 27 disposed thereon to open and close the rotary switch. Accordingly, after the blade of the rotary switch is rotated to a desired position, the switch 27 is closed, to thereby select a number or function. Thus, when switch 27 is closed and the rotary blade is coupled on one side to common electrode terminal 4 and to one of the terminals in the group of terminals 2", data signals representative of numerical information are supplied to calculator circuit 1. In the alternative, the rotary blade contacts common electrode 5 and one of the group of terminals 3' and actuation of switch 27 supplies function signals representative of the operation, decimal-point or clear to the calculator circuit.

Figure 7:
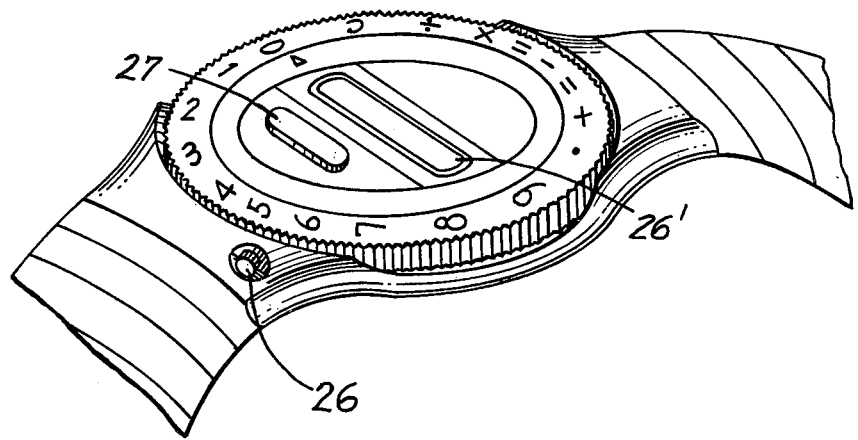
FIG. 7 is a perspective view of an electronic digital display timepiece including a calculator having the input circuitry depicted in FIG. 6.

Reference is made to FIG. 7 wherein the input circuit illustrated in FIG. 6 is incorporated into an electronic digital display wristwatch having a calculator, like reference numerals being utilized to denote like elements depicted in FIG. 5. It is noted that certain of the terminals can be utilized as correction switches when switch 26 selects a timekeeping mode, in the same manner as the calculator keys are utilized as correction switches in the embodiment depicted in FIG. 5.

Figure 8:
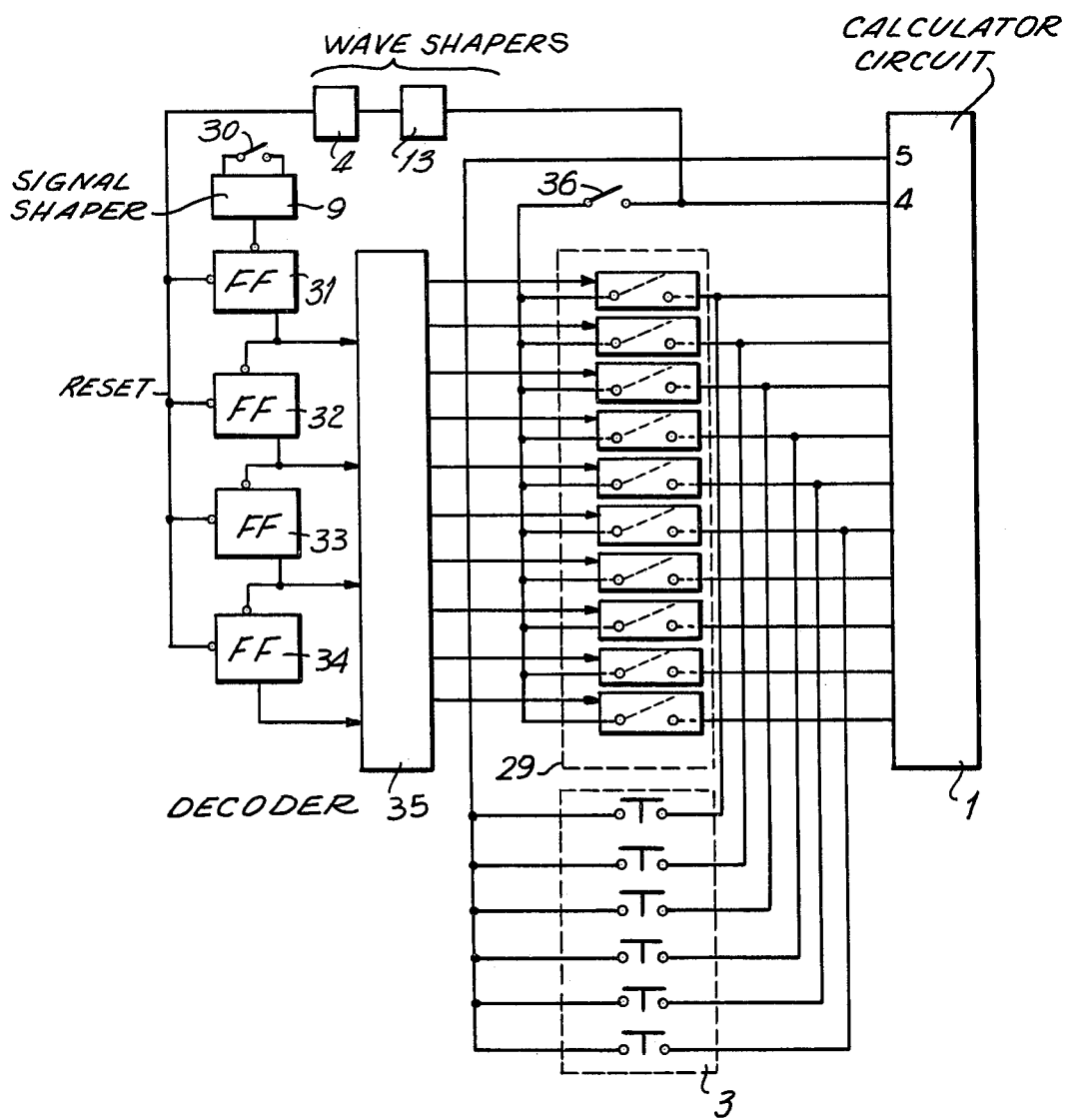
FIG. 8 is a block circuit diagram of a calculator circuit having an input circuit constructed in accordance with still another embodiment of the instant invention.

Reference is now made to FIG. 8, wherein input circuitry for a desk-top calculator constructed in accordance with still another embodiment of the instant invention is depicted, like reference numerals being utilized to denote like elements depicted in FIG. 1. The function switches 3, are directly coupled to the common electrode input terminal 5 of the calculator circuit to supply function signals representative of the operation, decimal-point and clear to the calculator circuit 1. The numerical switches in block 2 of the conventional calculator input circuit depicted in FIG. 1 for producing data signals representative of numerical information are replaced by an electronic circuit which utilizes two push-button switches to effect the input of data signals representative of numerical information as will be discussed more fully hereinafter.

The numerical information is achieved by the selective actuation of push-button switch 30. Switch 30 is coupled through a wave-shaping circuit 9 so that each actuation of the switch 30 produces a trigger pulse from circuit 9. The trigger pulses produced by circuit 9 are applied to series connected flip-flops 31 to 34 which produce 16 different binary coded representations. The first 10 conditions selected by the repetetive actuation of switch 30, are applied to decoder circuit 35 which, in response to the binary coded signals applied thereto, produces an output signal for application to one of the ten electronic switching circuits 29. In this manner, the one electronic switching circuit 29 representative of one of the numbers 0 to 9 corresponding to the count of flip-flops 31-34 is placed in an actuated state. Accordingly, by actuating switch 30 $n$ times (where $0 \leq n \leq 9$), a condition of the flip-flop is selected and the decoding circuit 35 actuates the one electronic switching circuit 29 corresponding to $n$. Thereafter, switch 36 is actuated and in response thereto, data signals are applied by the switching circuit 29 to the calculator circuit representative of $n$. Furthermore, wave-shaping circuits 13 and 14 of the type illustrated in FIG. 3A, are actuated in response to the closing of switch 36 and in response thereto effect a resetting of flip-flops 31 through 34 to a zero. Accordingly, it is necessary to utilize two switches 30 and 36, to supply the numerical information to the calculator circuit, and the number of keys is reduced from 16 in a conventional calculator to 8, namely, the 6 functional switches in block 3 and the 2 numerical switches 30 and 36.

Figure 9:
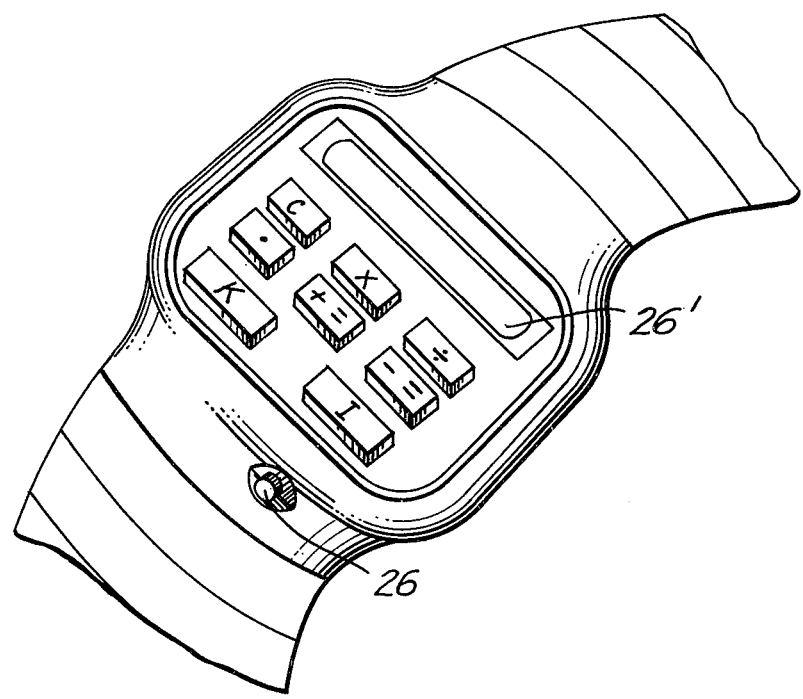
FIG. 9 is a perspective view of an electronic digital display wristwatch including a calculator having input circuitry constructed in accordance with the embodiment depicted in FIG. 8.

Reference is made to FIG. 9, wherein the input circuit illustrated in FIG. 8 is utilized in an electronic digital display timepiece including a calculator, like reference numerals being utilized to depict like elements depicted in FIG. 5. It is noted, that in view of the single function utilized by the correction switches in block 3, the function switches can be utilized when the timepiece is in a digital display mode as time correction switches. It is further noted, that although repetitive actuation of a single switch is utilized to produce data signals representative of numerical information, the same effect may be utilized to produce the function signals representative of the operation, decimal-point and clear operations. Specifically, actuation of a single switch a predetermined number of times would determine which operation, decimal point or clear function is desired and associated coded function signals could then be supplied to the calculator circuit in response to a further switch, thus further reducing the number of buttons required on the keyboard. A minimum of three buttons could be used, a first for selecting whether the second and third buttons provide data or function signals to the calculator circuit, a second for indexing similar to switch 30, and a third for feeding data similar to switch 36.

Figure 10:
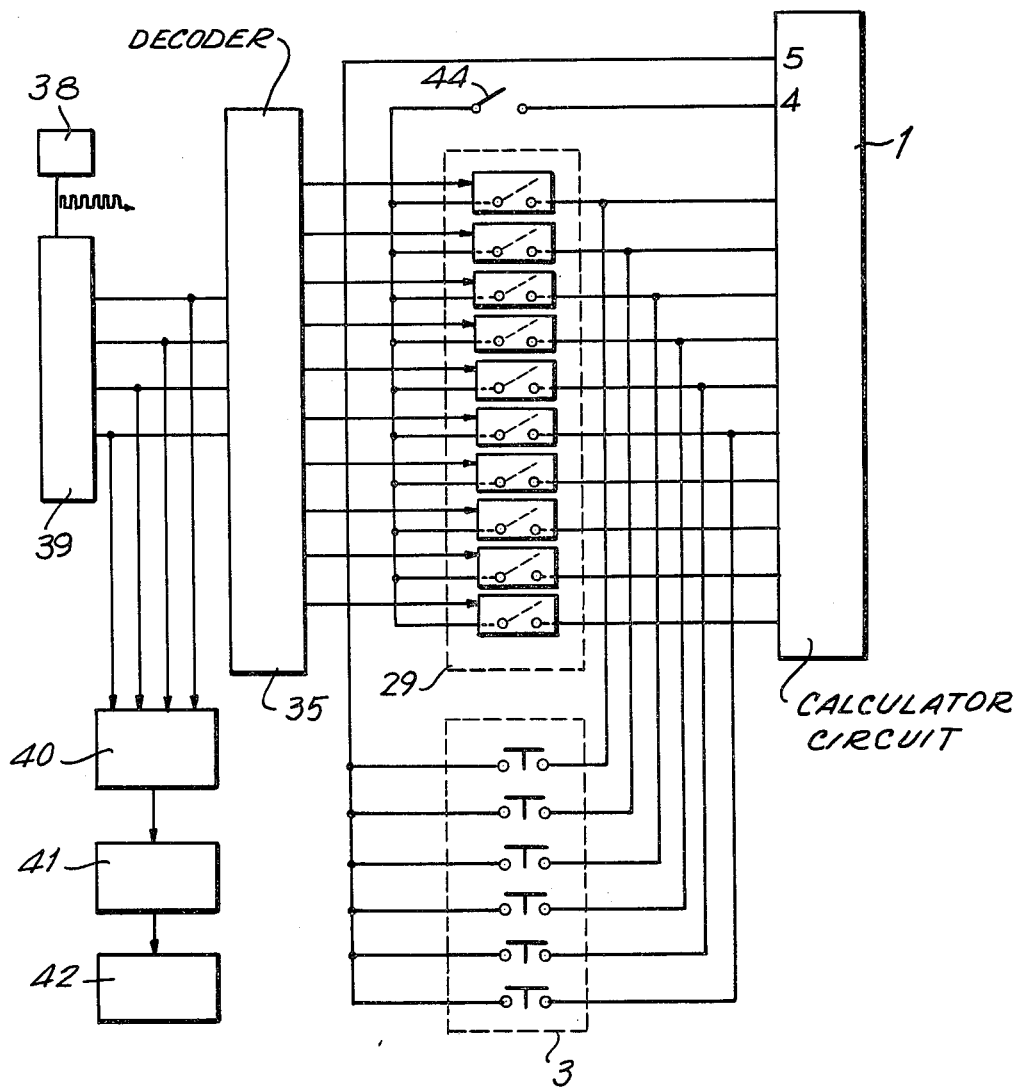
FIG. 10 is a block circuit diagram of an input circuit for a calculator constructed in accordance with still another embodiment of the instant invention.

Referring now to FIG. 10, still a further embodiment of an input circuit for a desk-top calculator is illustrated, like reference numerals being utilized to denote like elements depicted in FIG. 8. Although the same electronic switches 29 are utilized to produce the numerical information signals, the manner in which the numerical information signals are selected only requires the use of a single switch to obtain such information. A display element 42 is provided for indicating a number and as the number is indicated by the display, a switch 44 is actuated to apply data signals representative of the number displayed to the calculator circuit.

A non-stable multivibrator 38 produces an oscillating signal to decimal counter 39. In response thereto decimal counter 39 counts to 10 automatically and sequentially. The count of the decimal counter 39 is applied to decoder circuit 35 to supply the decoded signals to the electronic switches 29. Additionally, the signals representative of the count of decimal counter 39 are applied to decoder 40 which in turn are applied by a decoder 40 to a display 42 through a display driver 41 which energizes the display 42 to digitally display the number counted by decimal counter 39. By synchronizing the input to the electronic switches 29 from decoder circuit 35, with the number displayed by the display element 42, actuation of switch 44 effects an application of data signals representative of the number displayed by display 42 to the calculator circuit. Thus, if the display 42 indicates a number $n$ ($0 \geqq n \geqq 9$), the bank of electronic switches 29 produces a data signal representative of $n$ when switch 44 is closed. Accordingly, by this method only seven switches are required on the keyboard, the six function switches in block 3 and numerical actuation switch 44, thus reducing the number of switches from 16 in a conventional desk calculator to 7.

Reference is made to FIG. 11 wherein the calculator input circuit illustrated in FIG. 11 is included in an electronic digital display wristwatch including a calculator, like reference numerals being utilized to denote like elements in FIG. 9. The face of the wristwatch includes display element 45, corresponding to display 42 of FIG. 9, for indicating the number to be added. It is noted that like the embodiment in FIG. 9 the function keys can be utilized as correction switches when the timepiece is in a timekeeping mode, thereby further reducing the number of switches in the timepiece. Similarly, it is noted that display 45 (42) or an additional display and electronic circuit therefor could be utilized to select the six functions in the same manner as data is selected, in which case, a switch for selecting the data or function would be provided, to thereby furtherminimize the number of keys required.

Thus, as indicated above, by utilizing the calculator input circuit in accordance with the instant invention, a calculator can be utilized in an electronic timepiece because of the reduction in the number of switches or keys required by the small space provided. Moreover, the amount of switches in a wristwatch are further reduced by utilizing the calculator keys to further effect correction when the electronic timepiece is in a timekeeping mode.

It sill thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense. It is also to be understood that the following claims are intended to cover all of the generic and specific features of the invention herein described, and all statements of the scope of the invention which, as a matter of language, might be said to fall therebetween.

What is claimed is:

1. An electronic digital display wristwatch comprising timekeeping circuit means for producing timekeeping signals and calculator circuit means for producing calculating signals, digital display means for displaying one of actual time in response to said timekeeping signals being applied thereto, said display means being further adapted to display calculation information in response to said calculating signals being applied thereto, a plurality of input means adapted to supply to said calculator circuit means data signals representative of numerical information and function signals representative of operating functions to effect processing of said numerical information supplied by said data signals, said calculating circuit means including a function input and a numerical information input, each said input means including a manually operable switch, ten such switches being provided, one for each number of numerical information from 0 to 9 to be applied to the calculator circuit means, control circuit means disposed intermediate each of said manually operable switches and said respective numerical information and function inputs of said calculator circuit means, and one manually operable mode selection switch coupled to said control circuit means for disposing said control circuit means in one of a first numerical input mode and second function performing mode, said control circuit means being adapted to selectively couple either said ten manually operable input switches to said numerical information input of said calculator circuit means when said control circuit means is in a first numerical input mode or at least four of said ten manually operable input switches to said function input of said calculator circuit means in response to said mode selection switch disposing said control circuit means in said second function performing mode, whereby said at least four manually operable switches apply function signals representative of addition, subtraction, multiplication and division to said calculator circuit means to perform said respective functions when said control circuit means is disposed in said second function performing mode, said ten manually operable switches being provided with at least a first terminal, said manually operable switches coupled to said calculator circuit means when said control circuit means is in said second function performing mode having the respective first terminals connected in a first common connection, the balance of said manually operable switches having their respective first terminals connected in a second common connection, said control circuit means including a first electronic switch means intermediate said first and second common connection and a second electronic switch means intermediate said first common connection and said calculator circuit means, said first electronic switch means being closed when said control circuit means is in said first numerical input mode and being open when said circuit means is in said second function performing mode, said second electronic switch means coupling said first common connection to said numerical information input of said calculator circuit means when said control circuit means is in said first numerical input mode and to said function input when said control circuit means is in said second function performing mode.

2. An electronic wristwatch as recited in claim 1, said control circuit means including means for the automatic disposition thereof from said second function performing mode to said first numerical input mode in response to a function signal produced by an actuation of one of said manually operable switches when said circuit means is in said second mode.

3. An electronic wristwatch comprising timekeeping circuit means for producing timekeeping signals representative of actual time, time correction circuitry coupled to said timekeeping circuit means for correcting the timekeeping signals produced thereby and calculator circuit means for producing calculator signals representative of calculations performed thereby, digital display means coupled to said calculator circuit means and to said timekeeping circuit means for displaying actual time in response to said timekeeping signals being applied thereto, and calculator information in response to said calculator signals applied thereto, ten input switch means, said ten input switch means being adapted to produce input signals, said input signals being adapted to be supplied to said calculator circuit means as data signals representative of a numerical count from 0 to 9, respectively, at least four of said input signals produced by said ten input means being also adapted to be supplied to said calculator circuit means as operating functions, said operating functions affecting processing in said calculator circuit means of said numerical information supplied by said data signals, and one further changeover switch means disposed intermediate said at least four of said ten input means producing said input signals representative of both a numerical count and an operating function for changing over said calculator circuitry to perform an operating function in response to said changeover switch means being actuated, at least two other of said input switch means being further adapted to operate said timekeeping correction circuitry by said input signals, and input selection means disposed intermediate each of said at least two other input switch means and said calculator circuitry and timekeeping correction circuitry for selectively supplying said input signals produced by said two other input switch means to one of said calculator circuitry as data signals representative of numerical information or to said timekeeping correction circuitry as correction signals.

4. An electronic wristwatch comprising timekeeping circuit means for producing timekeeping signals representative of actual time, calculator circuit means for producing calculator signals representative of the calculating functions performed thereby, digital display means for displaying actual time in response to said timekeeping signals applied thereto and for displaying calculator information in response to one of said calculator signals and said timekeeping signals being applied thereto, input selection means disposed intermediate said calculator circuit means and said timekeeping circuit means and said digital display means for selectively applying one of said timekeeping signals and calculating signals to said digital display means, timekeeping correction circuit means coupled to said timekeeping circuit means for correcting the timekeeping signals produced thereby, ten input switch means, each said input switch means being adapted to be coupled to said calculator circuit means and to produce input signals, each said input signal being adapted to be supplied to said calculator circuit means as a data signal representative of a numerical count from 0 to 9, at least four of said input switch means being further adapted to be respectively coupled to said calculator circuit means for producing said input signals to be supplied to said calculator circuit means as data signals representative of multiplication, division, addition and subtraction operating functions, each of said operating functions effecting the respective processing in said calculator circuit means of said numerical information supplied by said data signals, and at least one of said input means being adapted to supply only data signals representative of numerical information to said calculator circuit means, said at least one input means being adapted to operate said timekeeping correction circuit means by applying an input signal thereto, and a changeover switch input means coupled intermediate said at least four input switch means and said calculator circuitry for changing over said data signals produced by said at least four input switch means from a numerical count to an operating function and applying same to said calculator circuitry, said input selection means also being disposed intermediate said at least one input switch means and said calculator circuit means and said timekeeping correction circuit means for selectively supplying said input signals produced by said at least one input switch as a data signal to one of said calculator circuit means as numerical information when said digital display means is displaying calculating information and to said timekeeping correction circuit means as a correction signal when said digital display means is displaying actual time.

* * * * *